A. MINNIS.
Potato-Digger.
No. 64,996. Patented May 21, 1867.
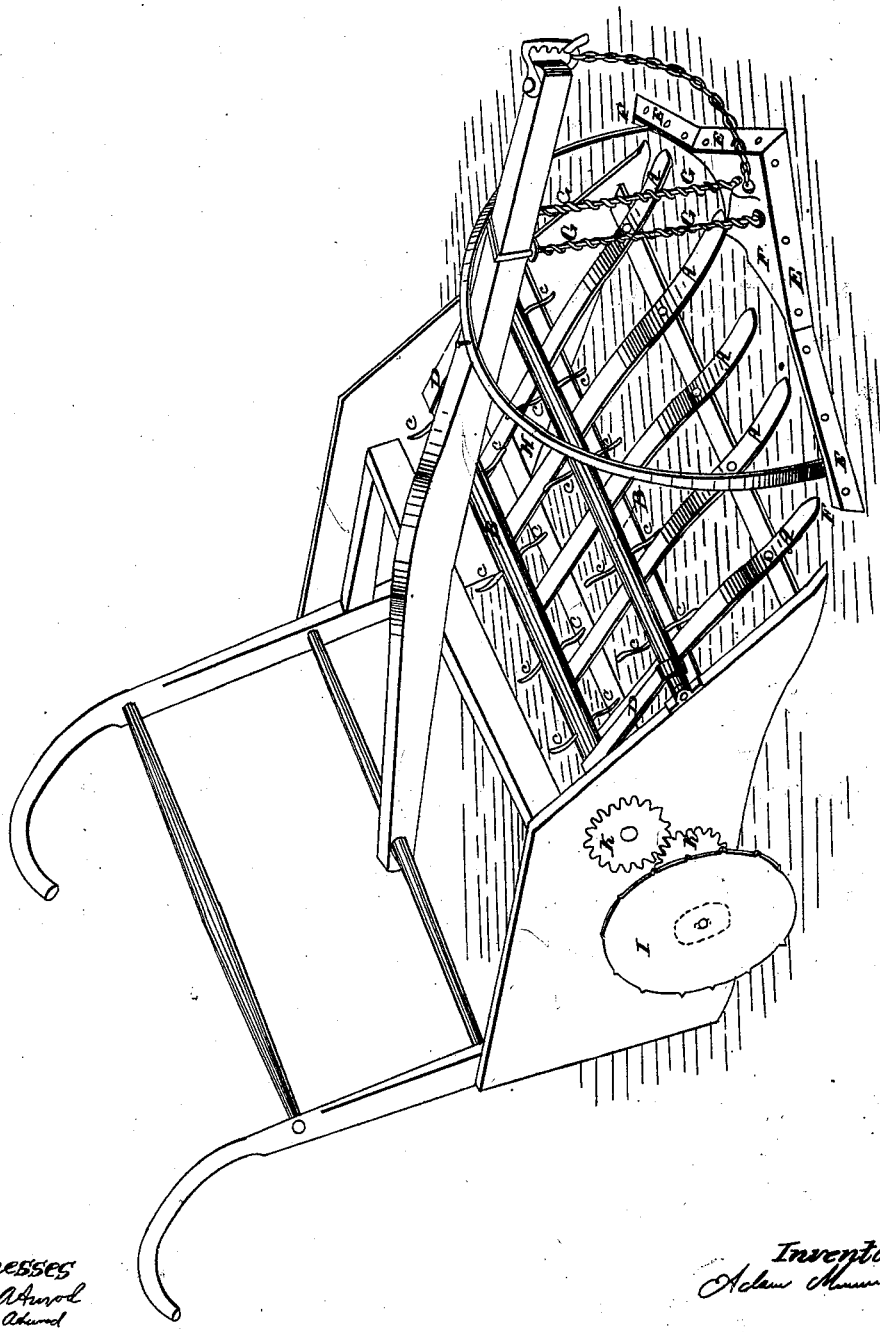
Witnesses Inventor

United States Patent Office.

ADAM MINNIS, OF CANTON TOWNSHIP, MICHIGAN.

Letters Patent No. 64,996, dated May 21, 1867.

---

IMPROVEMENT IN POTATO-DIGGER.

---

The Schedule referred to in these Letters Patent and making part of the same.

---

TO ALL WHOM IT MAY CONCERN:

Be it known that I, ADAM MINNIS, of the township of Canton, in the county of Wayne, and State of Michigan, have invented a new and useful Machine for Digging Potatoes, Onions, and other round root crops; and I do hereby declare the following to be a full, true, and exact description of the same, reference being had to the accompanying drawings, making a part of these specifications, in which—

Figure 1 represents the entire machine with the different parts lettered, and to which lettering I hereafter more particularly refer.

The nature and purpose of my machine having been named, I would state that it is intended to be drawn by one or more horses, according to the size used, and I now proceed to describe its construction, reference being had to the letters marked on fig. 1.

A A A A represent iron or steel shears that run into the earth underneath the roots of the potatoes or other vegetable and lift them from the ground. B B and C C represent four revolving shafts, with arms, (the latter somewhat curved,) that clear the potato or onion from the soil. D D represent endless chains or leather belts for driving the revolving shafts named. In this connection it may be deemed advisable to use cogged wheels. E E E E represent steel knives or cutters for cleaning off the tops. They are constructed in flexible sections so as to rise or fall to meet the inequalities of the ground. F F F represent wooden or cast-iron shoes jointed together so as to rise and fall, and suspended to the beam for the purpose of carrying the knives named. G G represent suspension-rods with spring coils by which the knives are pressed up or down according to the inequality of the ground. H represents the suspending-rod of the knives E E E E. I represents the driving-wheel, eight inches or more in diameter. K represents the driving-pinions. The whole suspended in the frame, as shown in fig. 1, which is designed to be twenty-four inches or more in width, and the depth of the throat of the machine six inches or more.

The operation of the machine is simple, requiring simply a longer or shorter attachment of the horse or horses, according to the depth or shallowness of the crop required to be dug. Thus, for potatoes a longer attachment would be required than for onions or turnips. When the crop is comparatively clear of tops (as onions) the knives or cutters may be removed, as not necessary. The number of shears may be increased or diminished as may be deemed expedient.

What I claim as my invention, and desire to secure by Letters Patent, is—

1. The whole combination of the machine for the use and purposes named.
2. I claim as new the shears A A, &c., five or more, in shape and manner of adjustment.
3. I claim as new the flexible knives E E, &c., and the manner of their adjustment.

The above claim of my machine with full specifications signed this tenth day of January, 1867.

ADAM MINNIS.

Witnesses:
 WM. S. ATWOOD,
 G. W. HUNT.